UNITED STATES PATENT OFFICE 2,624,763

BIS-QUATERNARY AMMONIUM COMPOUNDS

Moses Wolf Goldberg, Upper Montclair, and Lester Mischa Jampolsky, Clifton, N. J., assignors to Hoffmann-La Roche Inc., Nutley, N. J., a corporation of New Jersey No Drawing. Application June 19, 1951, Serial No. 232,463

3 Claims. (Cl. 260—567.6)

The present invention relates to new bis-quaternary ammonium compounds which can be represented by the following general formula:

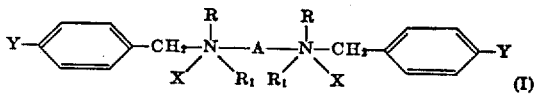

wherein R and R₁ represent lower alkyl radicals; X represents a halogen, e. g., chlorine, bromine or iodine; Y represents a nitrol rad'cal, and A represents

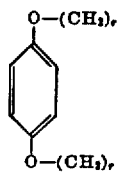

(where r=2 and 3).

The new compounds as represented by the above Formula I are useful as curariform compounds.

In general, the new compounds can be prepared by quaternizing di-tertiary amines of the following formula:

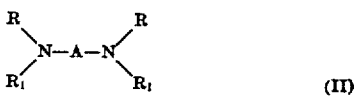

with a benzyl halide of the following formula:

R, R₁, A, X, and Y having the same meaning as hereinabove assigned thereto.

Preparation of a di-tertiary amine which is new is illustrated by the following example:

EXAMPLE A

*1,4-bis(γ-diethylaminopropoxy)benzene*

To 48.2 grams of hydroquinone dissolved in a solution of 20.2 grams of sodium in 800 cc. of absolute ethanol, there were slowly added at room temperature, 104 grams of γ-diethylaminopropyl chloride. After stirring and refluxing for 2 hours the sodium chloride which had formed was filtered off from the reaction medium and the filtrate concentrated by evaporation. The residual oil was extracted with ether and the ether solution dried over anhydrous sodium sulfate and then evaporated. The crude 1,4-bis(γ-diethylaminopropoxy)benzene thus obtained was distilled in vacuo, and the fraction boiling at 161–179° C. and 0.1 mm. mercury was dissolved in acetone. To the solution 63 grams of picric acid were added and the dipicrate precipitated. It melted at 159° C. The free base was obtained by treating the dipicrate with an excess of a saturated solution of lithium hydroxide, and the resulting mixture was extracted with ether. The ether extract was washed with water, dried over anhydrous sodium sulfate, and the ether evaporated. The residual base was then distilled in vacuo and boiled at 169° C. and 0.08 mm. mercury pressure.

The following examples will serve to illustrate the preparation of the new bis-quaternary ammonium compounds represented by the hereinabove given Formula I:

EXAMPLE 1

*γ,γ'-(p-phenylenedioxy)bis[diethyl(p-nitrobenzyl)propyl ammonium bromide]*

To 6.6 grams of 1,4-bis(γ-diethylaminopropoxy)-benzene in 100 cc. benzene were added 8.6 grams of p-nitrobenzylbromide in 100 cc. of benzene and the mixture was refluxed for 15 minutes. After standing at 25° C. for 18 hours the crystals which had formed were separated and recrystallized from ethanol and from dilute ethanol. The γ,γ' - (p - phenylenedioxy)bis[diethyl(p - nitrobenzyl)-propyl ammonium bromide] melted at 174–175° C.

EXAMPLE 2

*β,β'-(p-phenylenedioxy)bis[triethyl(p-nitrobenzyl)ammonium bromide]*

6 grams of 1,4-bis(β-diethylaminoethoxy)-benzene were dissolved in 125 cc. of benzene and 8.6 grams of p-nitrobenzyl bromide in 125 cc. of benzene were added. The mixture was refluxed for 1 hour and then allowed to stand at 25° C. for 18 hours. The crystals which formed were separated and recrystallized from methanol. The β,β'- (p - phenylenedioxy)bis[triethyl(p - nitrobenzyl)ammonium bromide] melted at 195–197° C. with decomposition.

We claim:

1. Bis-quaternary ammonium compounds represented by the following formula

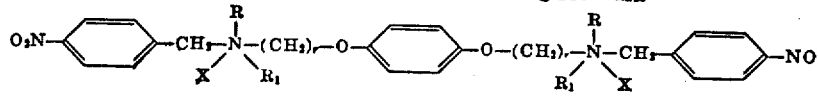

wherein R and R₁ represent lower alkyl radicals; X represents a halogen; and r represents an integer from 2 to 3.

2. $\gamma,\gamma'$ - (p - phenylenedioxy)bis[diethyl(p-nitrobenzyl)propyl ammonium bromide].

3. $\beta,\beta'$ - (p - phenylenedioxy)bis[triethyl(p-nitrobenzyl)ammonium bromide].

MOSES WOLF GOLDBERG.
LESTER MISCHA JAMPOLSKY.

REFERENCES CITED

The following references are of record in the file of this patent:

UNITED STATES PATENTS

| Number | Name | Date |
|---|---|---|
| 2,271,378 | Searle | Jan. 27, 1942 |
| 2,560,280 | De Benneville | July 10, 1951 |

FOREIGN PATENTS

| Number | Country | Date |
|---|---|---|
| 611,476 | Great Britain | Oct. 29, 1948 |

OTHER REFERENCES

Bovet, Compt. rend., vol. 225, pp. 74–76 (1947).

Certificate of Correction

Patent No. 2,624,763      January 6, 1953

MOSES WOLF GOLDBERG ET AL.

It is hereby certified that error appears in the printed specification of the above numbered patent requiring correction as follows:

Column 1, line 10, for "nitrol" read *nitro*; column 2, line 23, for "$\gamma,\gamma$-" read $\gamma,\gamma'$-; columns 1 and 2, extreme right-hand portion of the formula at the bottom of the columns, for "—NO" read —$NO_2$;

and that the said Letters Patent should be read as corrected above, so that the same may conform to the record of the case in the Patent Office.

Signed and sealed this 12th day of May, A. D. 1953.

[SEAL]

THOMAS F. MURPHY,
*Assistant Commissioner of Patents.* wherein R and R₁ represent lower alkyl radicals; X represents a halogen; and $r$ represents an integer from 2 to 3.

2. γ,γ' - (p - phenylenedioxy)bis[diethyl(p-nitrobenzyl)propyl ammonium bromide].

3. β,β' - (p - phenylenedioxy)bis[triethyl(p-nitrobenzyl)ammonium bromide].

MOSES WOLF GOLDBERG.
LESTER MISCHA JAMPOLSKY.

REFERENCES CITED

The following references are of record in the file of this patent:

UNITED STATES PATENTS

| Number | Name | Date |
|---|---|---|
| 2,271,378 | Searle | Jan. 27, 1942 |
| 2,560,280 | De Benneville | July 10, 1951 |

FOREIGN PATENTS

| Number | Country | Date |
|---|---|---|
| 611,476 | Great Britain | Oct. 29, 1948 |

OTHER REFERENCES

Bovet, Compt. rend., vol. 225, pp. 74–76 (1947).

Certificate of Correction

Patent No. 2,624,763    January 6, 1953

MOSES WOLF GOLDBERG ET AL.

It is hereby certified that error appears in the printed specification of the above numbered patent requiring correction as follows:

Column 1, line 10, for "nitrol" read *nitro*; column 2, line 23, for "γ,γ-" read γ,γ'-; columns 1 and 2, extreme right-hand portion of the formula at the bottom of the columns, for "—NO" read —*NO₂*;

and that the said Letters Patent should be read as corrected above, so that the same may conform to the record of the case in the Patent Office.

Signed and sealed this 12th day of May, A. D. 1953.

[SEAL]

THOMAS F. MURPHY,
*Assistant Commissioner of Patents.*

Certificate of Correction

Patent No. 2,624,763                                January 6, 1953

MOSES WOLF GOLDBERG ET AL.

It is hereby certified that error appears in the printed specification of the above numbered patent requiring correction as follows:

Column 1, line 10, for "nitrol" read *nitro*; column 2, line 23, for "$\gamma,\gamma$-" read $\gamma,\gamma'$-; columns 1 and 2, extreme right-hand portion of the formula at the bottom of the columns, for "—NO" read —$NO_2$;

and that the said Letters Patent should be read as corrected above, so that the same may conform to the record of the case in the Patent Office.

Signed and sealed this 12th day of May, A. D. 1953.

[SEAL]

THOMAS F. MURPHY,
    *Assistant Commissioner of Patents.*